(12) United States Patent
Dawson (10) Patent No.: US 9,429,270 B2
(45) Date of Patent: Aug. 30, 2016

(54) BEARING GREASE PACKER

(71) Applicant: Noel Lindsay Dawson, Mudgee (AU)

(72) Inventor: Noel Lindsay Dawson, Mudgee (AU)

( * ) Notice: Subject to any disclaimer, the term of this patent is extended or adjusted under 35 U.S.C. 154(b) by 246 days.

(21) Appl. No.: 14/248,395

(22) Filed: Apr. 9, 2014

(65) Prior Publication Data

US 2014/0318899 A1    Oct. 30, 2014

Related U.S. Application Data

(62) Division of application No. 12/598,291, filed on Oct. 30, 2009, now Pat. No. 8,720,647.

(51) Int. Cl.
| | |
|---|---|
| *F16N 3/10* | (2006.01) |
| *F16N 11/10* | (2006.01) |
| *F16N 37/00* | (2006.01) |
| *F16C 33/66* | (2006.01) |
| *F16C 19/36* | (2006.01) |

(52) U.S. Cl.
CPC .............. *F16N 3/10* (2013.01); *F16C 33/6622* (2013.01); *F16N 11/10* (2013.01); *F16N 37/003* (2013.01); *F16C 19/364* (2013.01)

(58) Field of Classification Search
CPC .............. F16C 19/364; F16C 33/6622; F16C 33/6625; F16N 11/10; F16N 37/003; F16N 3/10
USPC ................ 184/5.1, 6.1, 6.5, 55.1, 57, 105.2; 134/136
See application file for complete search history.

(56) References Cited

U.S. PATENT DOCUMENTS

| | | | |
|---|---|---|---|
| 1,991,542 A | 2/1935 | Cavanaugh | |
| 2,168,746 A | 8/1939 | Saal | |
| 2,248,940 A | 7/1941 | Berg | |
| 4,168,766 A | 9/1979 | Shultz | |
| 5,036,950 A * | 8/1991 | Clark | F16N 37/003 184/5.1 |
| 5,109,955 A * | 5/1992 | Clark | F16N 37/003 184/105.2 |
| D327,399 S * | 6/1992 | Cox | F16C 33/6625 D8/14.1 |
| 5,782,318 A | 7/1998 | Ng | |
| 5,992,569 A * | 11/1999 | Dawson | F16N 37/003 184/28 |
| 6,155,380 A * | 12/2000 | Ichikawa | F16N 11/08 184/105.2 |
| 6,520,292 B1 | 2/2003 | Kurtz | |
| 7,467,690 B2 * | 12/2008 | Liao | F16N 37/003 184/105.1 |
| 7,621,375 B2 * | 11/2009 | Liao | F16N 11/08 184/105.2 |
| 8,720,647 B2 * | 5/2014 | Dawson | F16C 33/6625 134/136 |
| 2003/0029677 A1* | 2/2003 | Kurtz | F16C 33/6622 184/5.1 |
| 2007/0034451 A1* | 2/2007 | Liao | F16N 37/003 184/5.1 |
| 2008/0017449 A1 | 1/2008 | Liao | |

FOREIGN PATENT DOCUMENTS

| | | |
|---|---|---|
| AU | 51538/79 | 4/1981 |
| AU | 2002100813 | 5/2003 |
| JP | 1026296 | 1/1998 |
| WO | 96/05465 | 2/1996 |

\* cited by examiner

*Primary Examiner* — William E Dondero
*Assistant Examiner* — Robert T Reese
(74) *Attorney, Agent, or Firm* — Skinner and Associates

(57) ABSTRACT

A bench top bearing packer tool includes supply means for delivering a controlled amount of grease, support means for locating a bearing in a position where a bearing cage and rollers of the bearing may be lubricated with the grease delivered by the supply means, the supply means having a grease delivery outlet communicating with a grease livery inlet of the support means by a grease flow passageway, and a means for controlling the passage of grease through the inlet to the bearing cage and rollers of the bearing.

15 Claims, 15 Drawing Sheets

Fig. 18 — Air Flow Regulated

Fig. 17 — Air Flow Restricted

BEARING GREASE PACKER

CROSS-REFERENCE OT RELATED APPLICATION

This is a divisional of U.S. Ser. No. 12/598,291, filed Oct. 30, 2009, status pending, which is a Sect. 371 National Stage of PCT International Application No. PCT/AU2008/000549, filed on May 1, 2008, claiming priority of Australian Patent Application No. 2007902297, filed on May 1, 2007, the contents of both application hereby being incorporated by reference.

FIELD OF THE INVENTION

The present invention relates to a bearing lubrication tool and, in particular, to a tool for allowing bearing grease to be repacked into the bearing cage and against the rollers of bearings used in wheel hubs.

BACKGROUND OF THE INVENTION

Bearings, as used in the wheel hubs of motor vehicles, trailers, caravans, aircraft, agricultural equipment and the like, require lubrication from time to time. This is initially provided at the time of assembly of the bearing, but maintenance of wheel hub bearings is an on going requirement. On some four wheel drive vehicles, hub maintenance and repacking the bearings with grease is required at 30,000 km traveled. Aircraft bearings are serviced at 100 hrs flight time. These two examples alone show the many thousands of hours spent per day globally in the servicing of bearings of industrial, transport and recreational machines.

Bearing grease repacking is often performed manually. A blob of grease is pushed and rubbed by hand into the bearing cage and against the rollers. While this method does provide lubrication of the bearing, it adds the dirt from the operator's skin to the grease and it exposes the person's hand to the deleterious effects of grease. It also uses a large amount of hand towel for cleaning up and is time consuming. All of these factors add to the cost of performing bearing grease repacking, and run against the trend towards improved occupational health and safety practices.

It is, therefore, an object of the present invention to provide a bearing lubrication tool that avoids these problems.

SUMMARY OF THE INVENTION

According to the invention, there is provided as bearing lubrication tool comprising:
supply means for delivering a controlled amount of grease,
support means for locating a bearing in a position where a bearing cage and rollers of the bearing may be lubricated with the grease delivered by the supply means,
securing means for detachably coupling the supply means and the support means,
the supply means having a grease delivery outlet communicating with a grease delivery inlet of the support means,
a grease flow passageway for transferring grease received through the inlet to the bearing cage and rollers of the bearing,
a plate adapted to prevent grease entering the bore of the bearing, wherein the support means includes a clamp adapted to apply downward pressure on the bearing sufficient to prevent upward movement of the bearing when grease is transferred thereto,
the clamp being supported at a variable position relating to a shaft of the support means.

Preferably, the shaft is mounted to a base portion of the support means.

In a first preferred form, the base portion to which the shaft is mounted is to one side of the clamp, and the clamp is supported indirectly to the shaft by an arm assembly.

In a second preferred form, the base portion to which the shaft is mounted is beneath the clamp, and the clamp is supported directly on the shaft.

In this second preferred form, the clamp is threadably engaged to the shaft, and a nut is threadably engaged to the shaft above the clamp and is adapted to apply downward pressure on the clamp.

BRIEF DESCRIPTION OF THE DRAWINGS

In order that the Invention may be readily understood and put into practical effect, reference will now be made to the accompanying drawings, in which.

DETAILED DESCRIPTION OF THE DRAWINGS

The bearing lubrication tool 10 shown in FIGS. 1 to 4 has a side mounted shaft 11, and the bearing lubrication tools 12,14 shown in FIGS. 5 to 8 have a centre mounted shaft 15.

Figures 1, 1A:
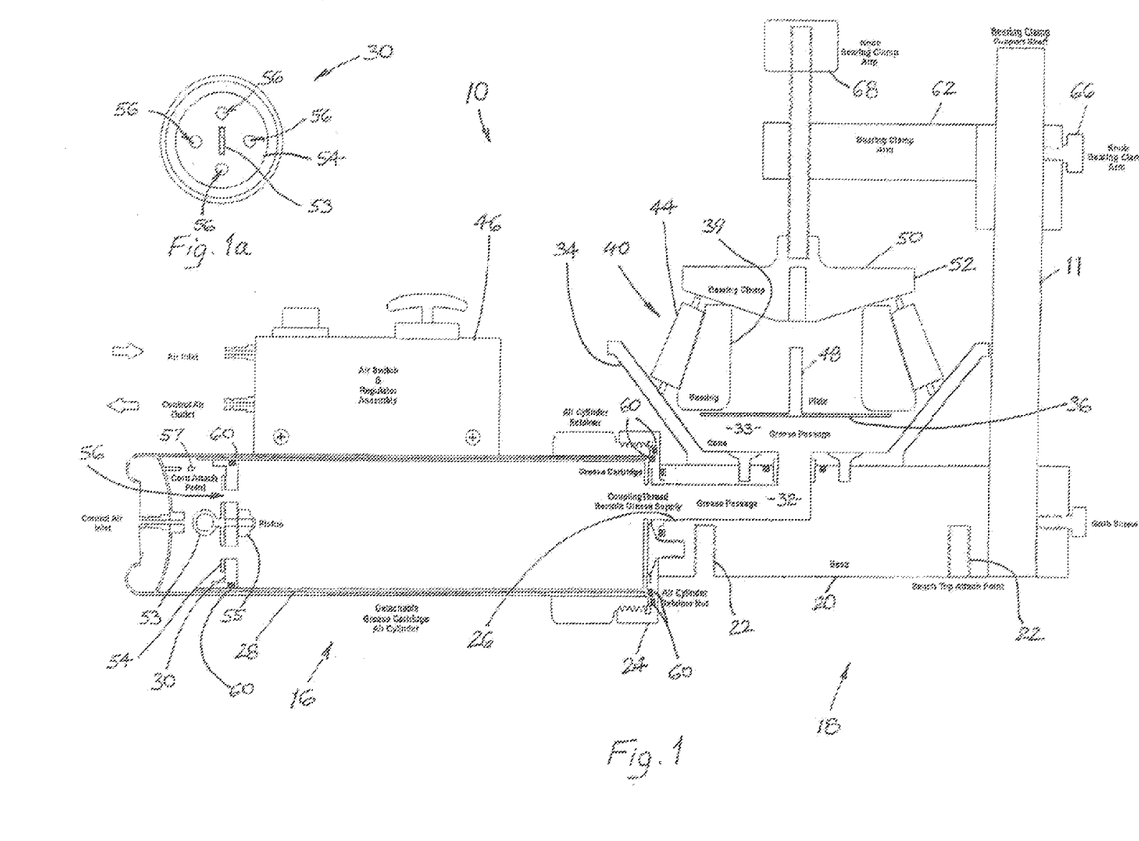
FIG. 1 is a partly sectioned side view of a bearing lubrication tool according to a first preferred embodiment of the invention.
FIG. 1a is an isolated end view of the piston of the supply means of the tool of FIG. 1.
Figure 2:
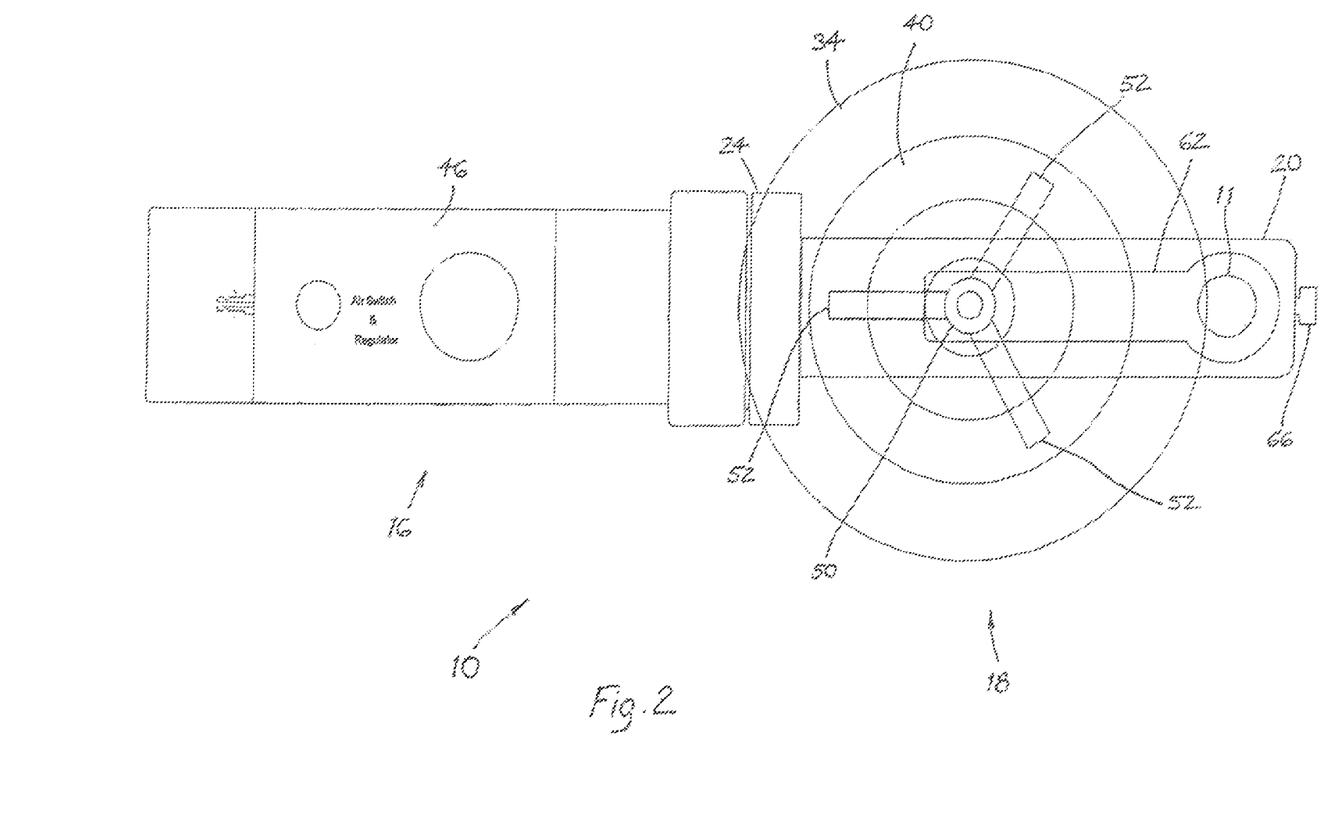
FIG. 2 is a top view of the tool of FIG. 1.
Figure 3:
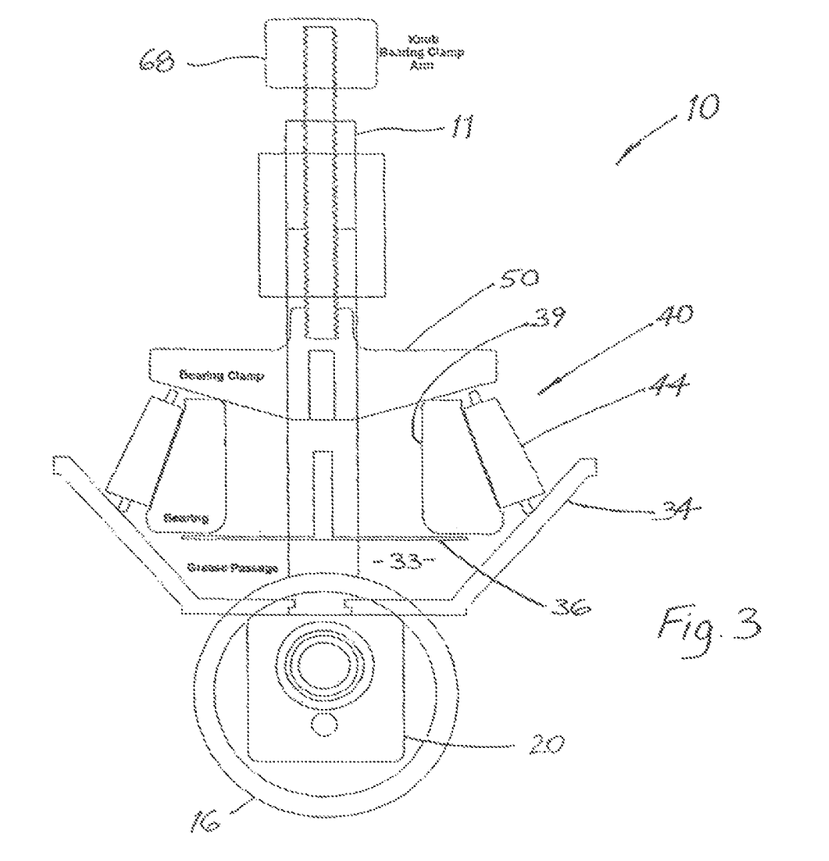
FIG. 3 is a right side view of the tool of FIG. 1.

The tool 10 includes two sub-assemblies, namely, a supply means in the form of a detachable grease cartridge air cylinder assembly 18, and a support means in the form of a bearing packer head 18 for locating a bearing 40 to be lubricated by grease delivered by the detachable grease cartridge air cylinder assembly 16.

A base 20 of the bearing packer head 18 is designed for use in either a work shop or a field environment, and can be held in the jaws of a vice or attached to a work bench by its bench top attachment points 22. An air cylinder retainer nut 24 is attached to the base 20 and can be removed so that the bearing packer head 18 can be used without the detachable grease cartridge air cylinder assembly 16. This option (see FIG. 8) is useful for workshops that use large pneumatic/electric powered, remote grease storage drums. The bearing packer head 18 has provision made to attach a coupling 25 and connect to a remote supply by use of its coupling thread 26.

The tool 10 allows the operator to repack bearings with grease quickly without needing to have grease on his or her hands. The air cylinder assembly 16 uses a commercially available pro-loaded grease cartridge 28, which, when installed, may be emptied of grease when compressed air controlled by the operator is used to displace the piston 30, thereby moving the grease through the grease passage 32 to a region 33 between a cone 84 and a plate 36. As more and more grease enters the region 33, grease first lifts the plate 36 which seals the bore defined by the inner race 39 of the bearing 40, then moves to the only exit via the bearing cage and rollers 44, thereby greasing the bearing 40 to the desired level of lubrication. The flow rate is regulated by use of an air switch and regulator device 46 to be described later. As the plate 36 lifts and contacts the Inner race 39, the plate shaft 48. Is used to visually sight and move the plate 36 to approximate centre so as to prevent entry of grease to the bearing bore. This is easy to accomplish as the bearing clamp 50 has three fingers 52 clamping the bearing 40 against the cone 34, allowing adequate access to the plate shaft 48.

The piston 30 used in the air cylinder assembly 16 is purpose made with the following features. As a commercially available pre-loaded grease cartridge is never totally full of grease, to insert a piston into the bore of the cartridge would allow trapped air to enter the grease passage 32 with the grease, the trapped air eventually finding its way into the cone region 33, which could cause spattering of grease. To prevent this, the piston 30 has a valve arrangement, easily operated by turning the eye bolt 53 with its attached valve plate 54 and retainer 55. This action vents the cartridge 28 to allow all the air to escape through vent holes 56 of the piston 30 as the piston 30 is inserted. When grease appears at the vent holes 56, the eye bolt 53 is rotated a quarter turn to close the vent holes 56.

The eye bolt 53 also functions as an attachment point for a cord, one end of the cord being thereby attached to the piston 30 with the other end of the cord being attached to an anchor point 57 located inside the blind end of the air cylinder assembly 16. This provides a means for removing the piston 30 once the grease is exhausted.

The air cylinder assembly 16 includes a control device 46 comprising a self exhausting air switch needed to start and stop grease supply and a regulator for regulating the air pressure on the piston 30 so as to provide adequate control of grease supply. For the air pressure to be effective in the air cylinder assembly 16. O-ring seals 60 are installed to seal the air cylinder assembly and to seal the grease cartridge 28 to the retainer nut 24. This ensures the air pressure is effective only on the piston 30, which also has an O-ring seal 60. The diameter and length of the air cylinder assembly 16 are designed to suit the size of grease cartridge standard package sizes of different countries.

Figure 4:
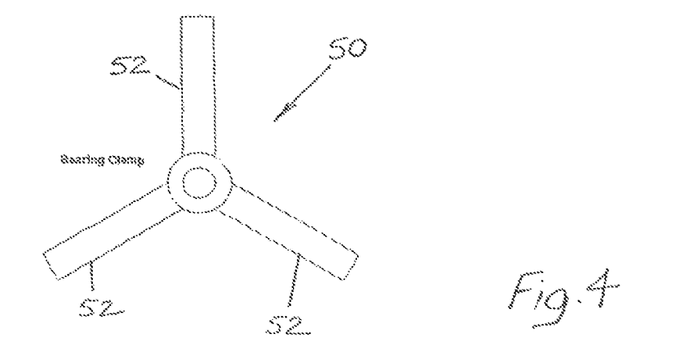
FIG. 4 is an isolated top view of the clamp of the support means of the tool of FIG. 1.

The bearing packer head 18 provides a simple means of retaining the bearing 40 during greasing operations. Once a bearing 40 is installed with a suitably sized plate 36, the bearing clamp arm 62 is turned around the side mounted shaft 11 until centred over the bore of the bearing 40, the bearing 40 and clamp 50 both finding centre due to the symmetrical shape of the cone 34 and taper of the bearing clamp 60. After greasing, both retainer knobs 66,68 are easily loosened and the arm 62 and clamp 50 are lifted and turned to one side to gain clear access for lifting the bearing 40 clear of the cone 34. The bearing bore is free of grease and so the now lubricated bearing 40 can easily be lifted up by gripping inside the bore.

It will be readily appreciated that the cone 34 and plate 36 can be produced in various sizes as options to the purchaser. The base 20 of the bearing packer head 18 can also be produced in various sizes to accommodate different applications.

Figure 5:
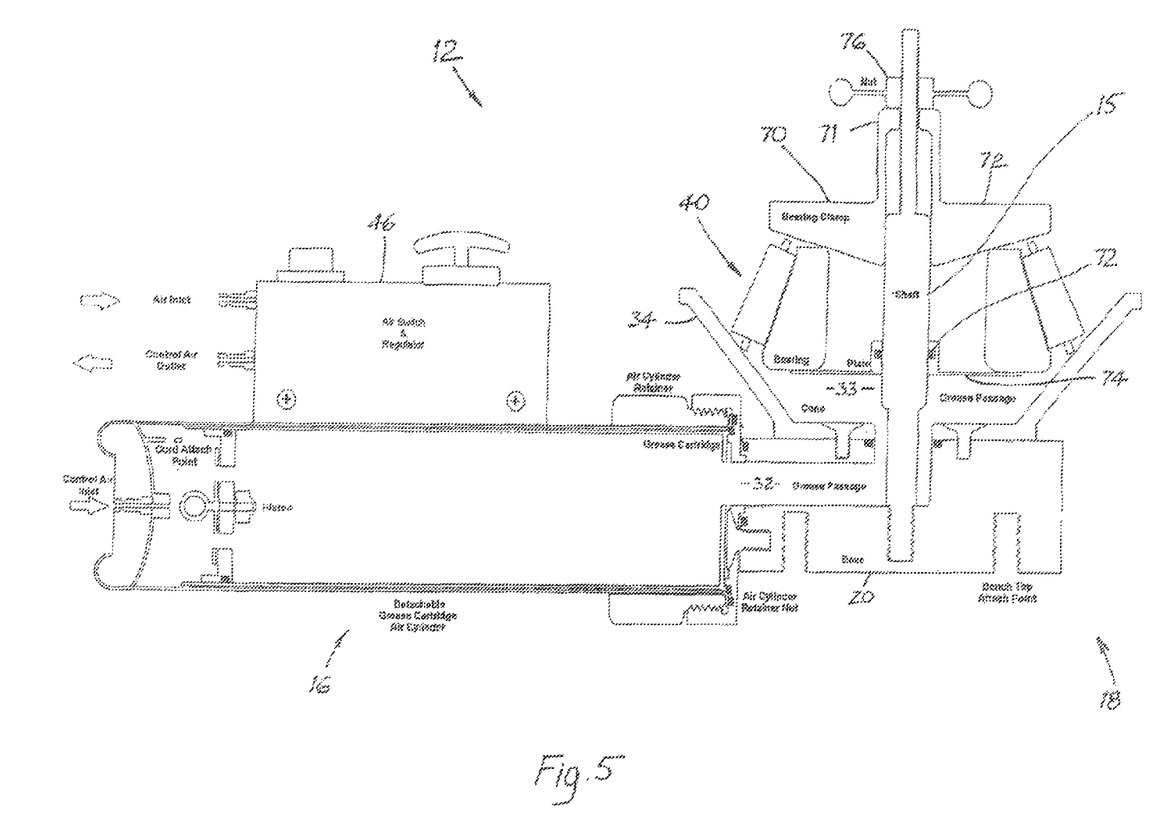
FIG. 5 is a partly sectioned side view of a bearing lubrication tool according to a second preferred embodiment of the invention.
Figure 6:
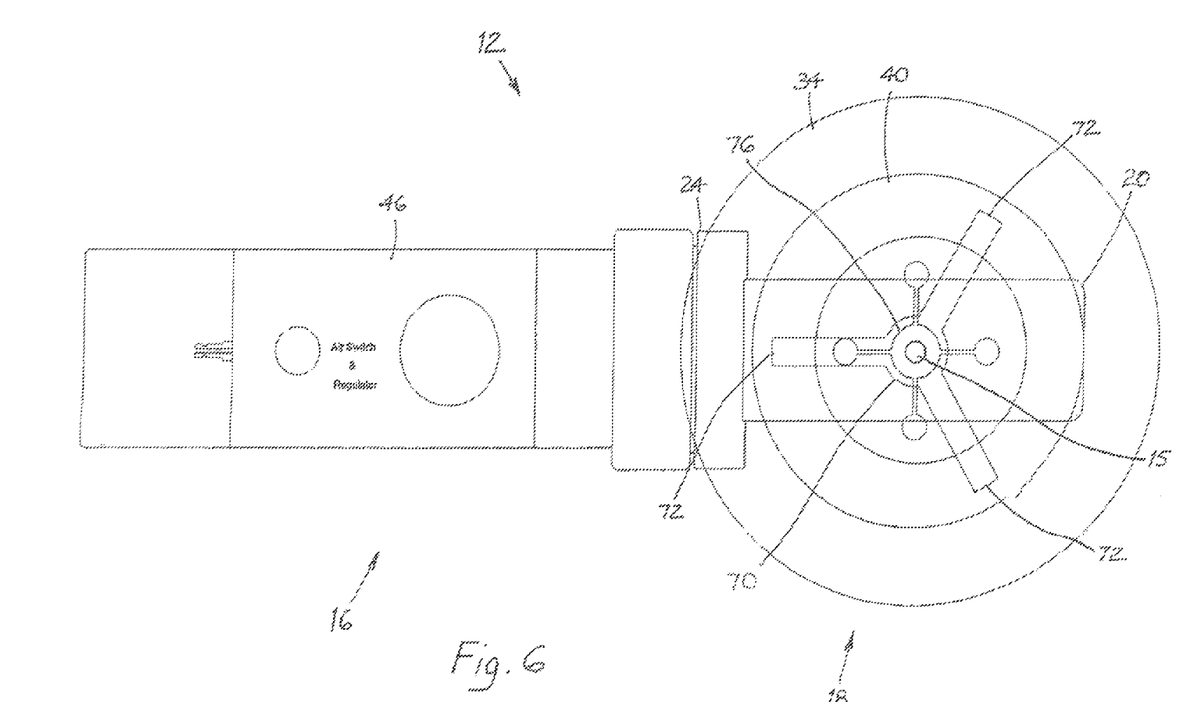
FIG. 6 is a top view of the tool of FIG. 5.
Figure 7:
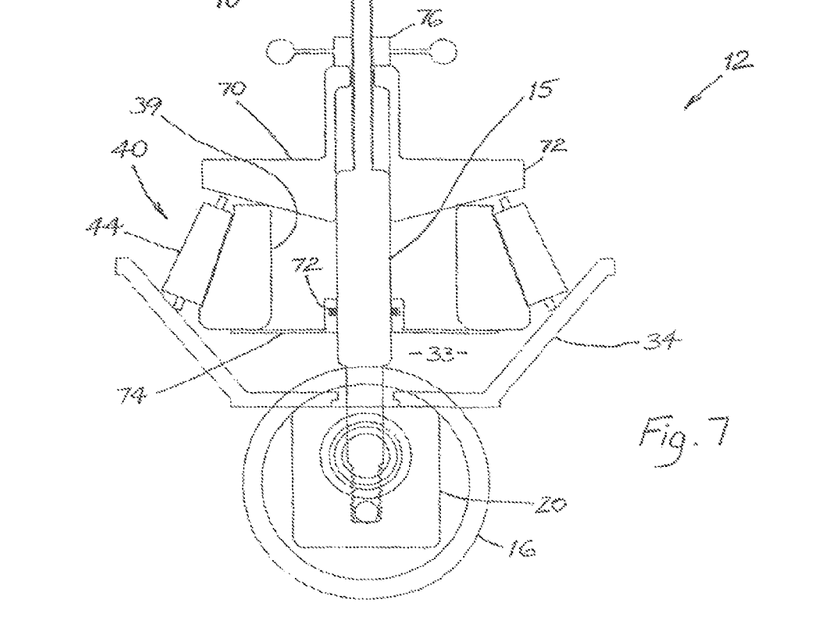
FIG. 7 is a right side view of the tool of FIG. 5.
Figure 8:
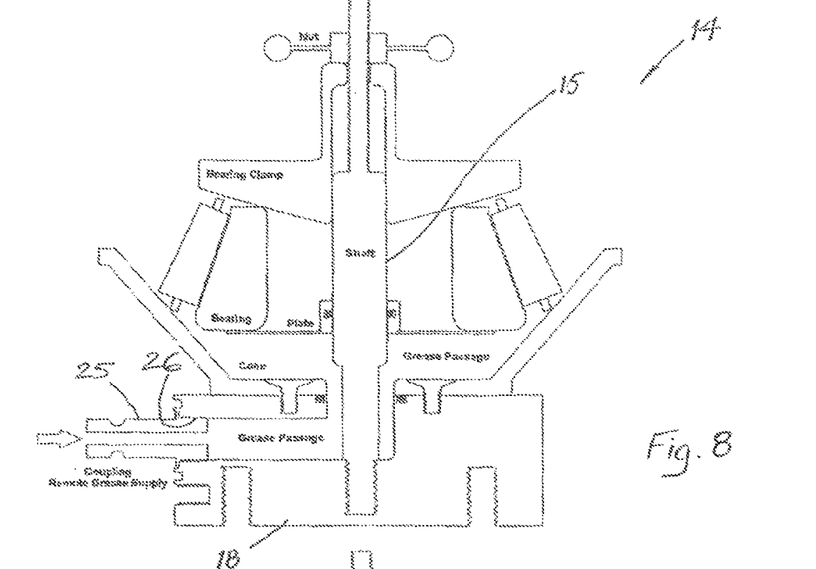
FIG. 8 is a partly sectioned side view of a bearing lubrication tool according to a third preferred embodiment of the invention.

The tool 12 shown in FIGS. 5 to 7 is different to the tool 10 shown in FIGS. 1 to 4 only in the way the bearing 40 is retained. In order to use a centre thrust bearing clamp 70, a long, centre mounted shaft 15 with threaded sections and smooth sections is needed to provide clamping and also to allow the plate O-ring 72 to seal and slide. The bearing clamp 70 is such that a knurled section 71 above the three fingers 72 provides the operator with a handle for fitting and removing the clamp 70 to access the bearing 40 and plate 74. A nut 76 is used to provide the clamping force required. The screw-on nature of the nut 76, while standard, may prove time consuming, especially if the bearing is small and locates into the bottom of the cone.

Figures 9, 10, 11:
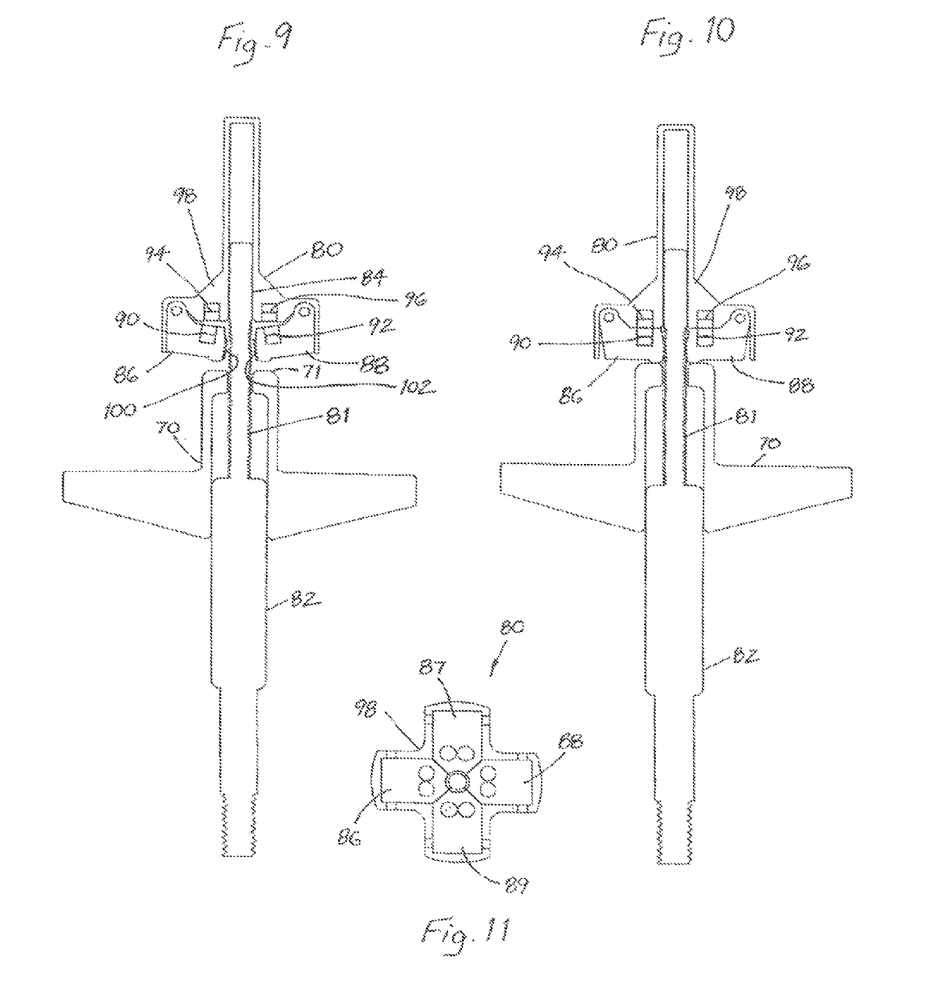
FIG. 9 is a partly sectional side view of an assembly comprising a shaft, clamp and nut which may be used in a bearing lubrication tool according to a fourth preferred embodiment of the invention, the nut shown not applying downward pressure on the clamp.
FIG. 10 is a view similar to that of FIG. 9, but with the nut shown applying downward pressure on the clamp.
FIG. 11 is a bottom view of the nut of the assembly shown in FIG. 9.
Figures 12, 13, 13A:
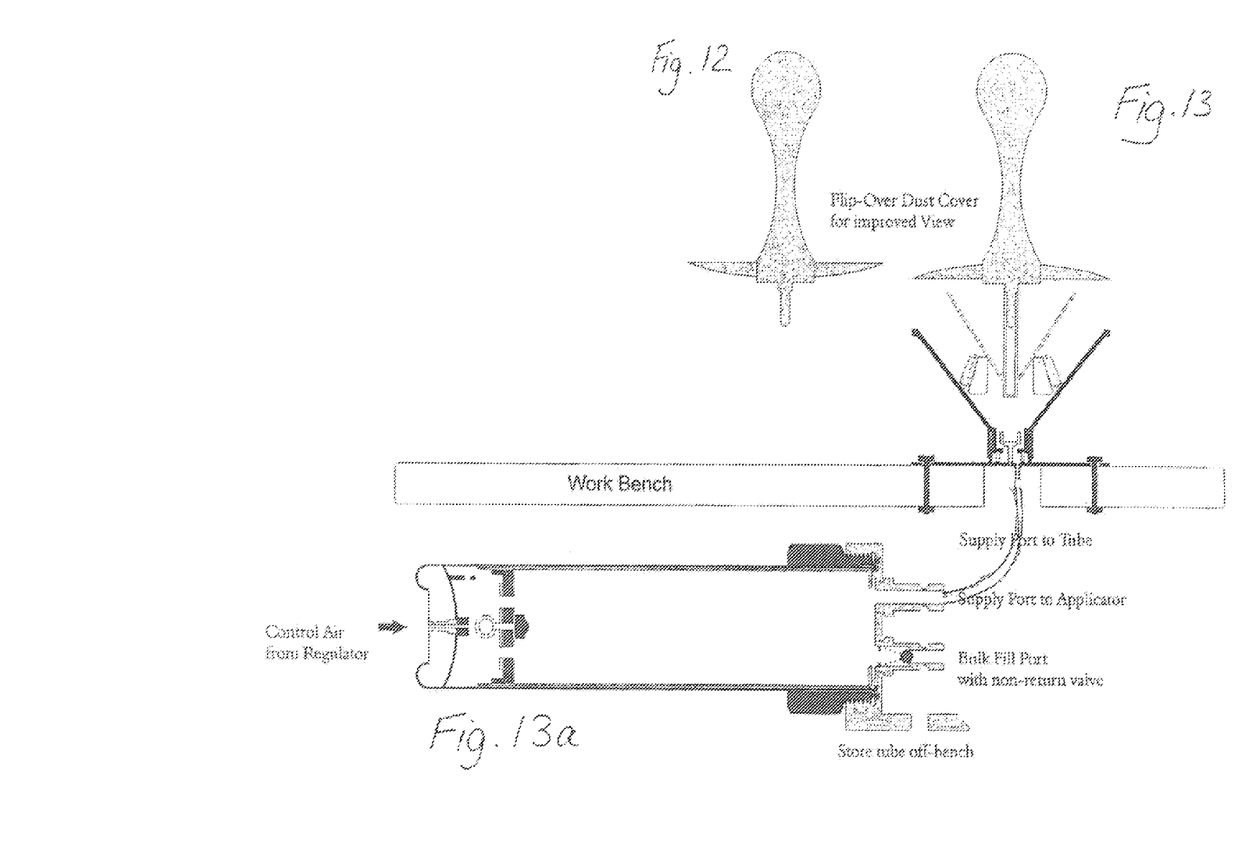
FIGS. 12 to 16 show side sectional views of a bench top bearing grease packer tool according to a further preferred embodiment of the invention.
Figure 14:
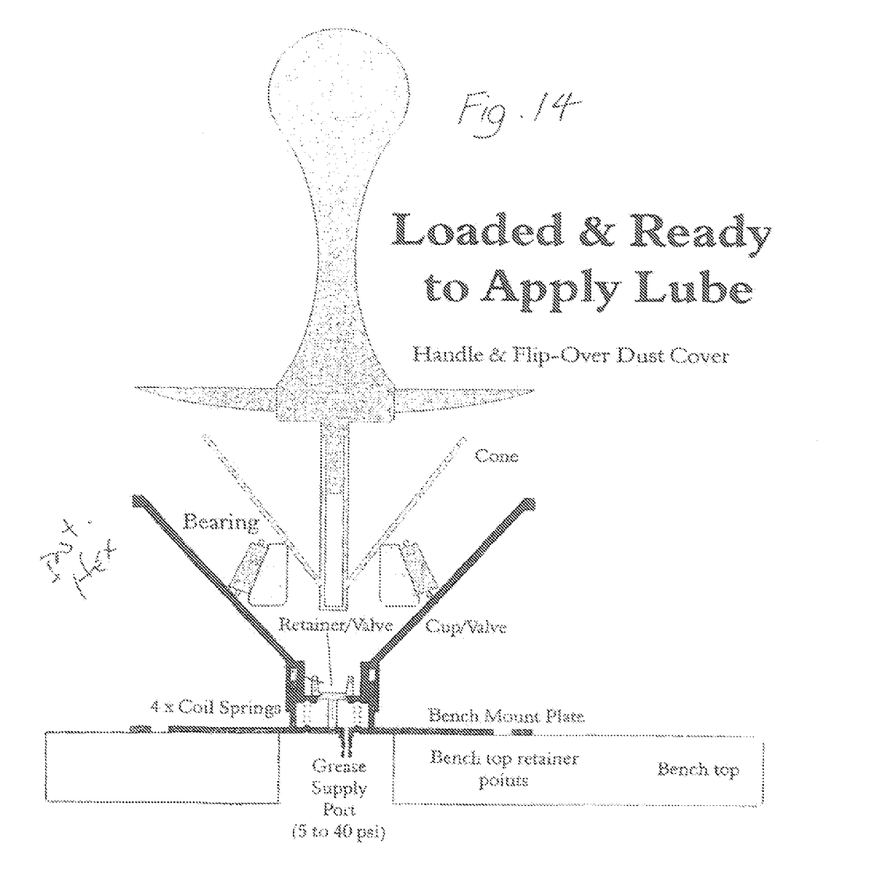
Figure 15:
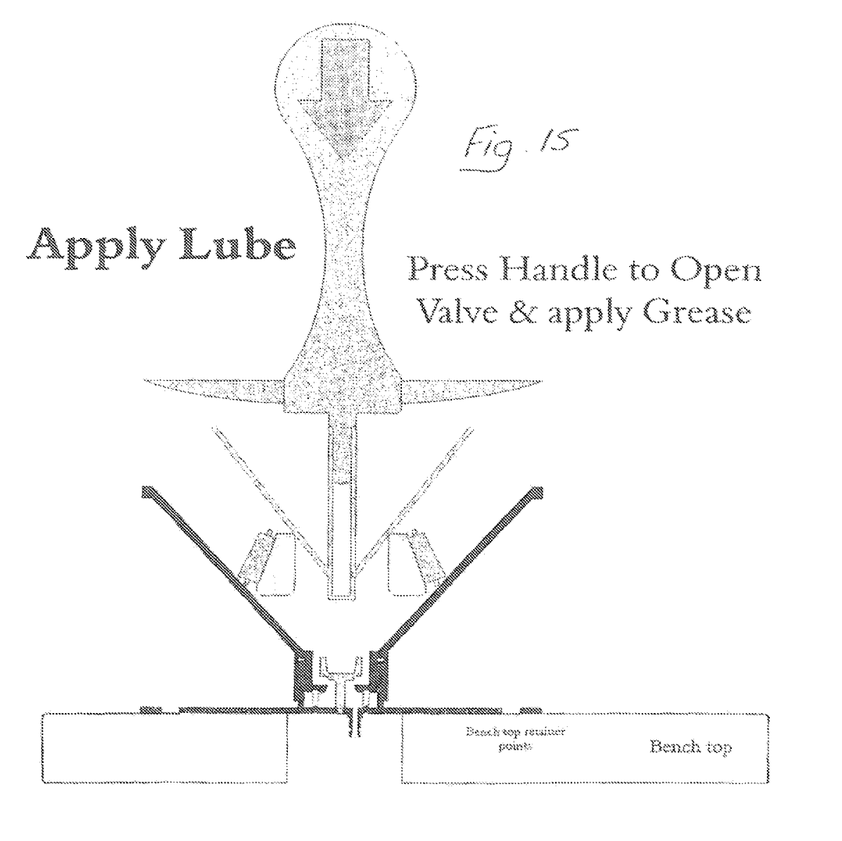
Figure 16:
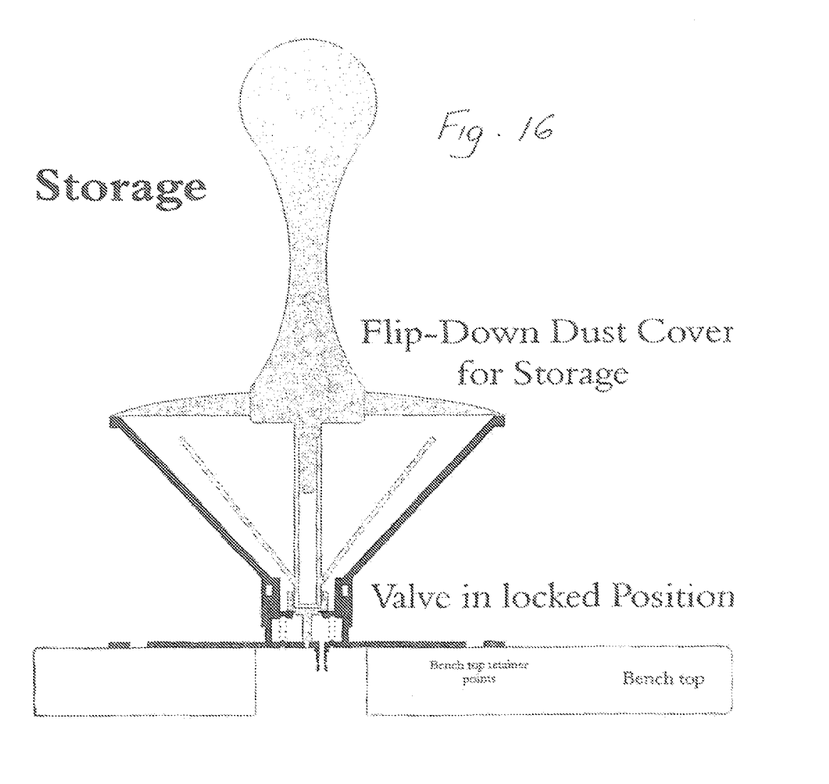

The use of the nut 80 in the assembly shown in FIGS. 9 and 10 will overcome this problem, and make clamping fast and simple. The thread 81 of the centre mounted shaft 82 does not extend all the way to the top, allowing the nut 80 to quickly slide downwardly over the unthreaded part 84 of the shaft 82 and to centre over the clamp 70 end thread 81 of the shaft 82. The four quarter nut sections 86,87,88,89 (see also FIG. 11) have small magnets 90,92 inserted. These align with a corresponding set of like poled repelling magnets 94,96 set into the housing 98 of the nut 80. As the nut 80 is lowered to contact the clamp 70, the quarter nut sections 86,87,88,89 are deflected inwards against the magnetic repelling force, allowing the nut threads 100,102 to engage the shaft thread 81. To simply retain the bearing 40, the nut 80 is slid over the shaft 82 and the knurled section 71 of the clamp 70 is pressed downwardly and turned half a turn. After greasing, the nut 80 is reverse turned and lifted off the shaft 82, followed by the clamp 70 and bearing 40. The plate 74 can stay on the shaft 82 for the next bearing of the same size or can be removed therefrom and replaced with a plate of a different size to suit a different size bearing.

In practice, the speed of lubrication may be increased by greasing the smallest size bearings first and the largest ones last.

It will be apparent to persons skilled in the art that various modifications may be made in details of design and construction of the various bearing lubrication tools described above without departing from the scope and ambit of the invention. It will also be apparent that the nut 80 can have a wide range of uses, not only as part of an assembly (such as is shown in FIGS. 9 and 10) which may be used in a bearing lubrication tool of the present invention.

The bench top bearing packer tool shown in FIGS. 12 to 16 includes supply means for delivering a controlled amount of grease, support means for locating a bearing in a position where a bearing cage and rollers of the bearing may be lubricated with the grease delivered by the supply means, the supply means having a grease delivery outlet communicating with a grease delivery inlet of the support means by a grease flow passageway, and means for controlling the passage of grease through the inlet to the bearing cage and rollers of the bearing.

The grease cartridge or tube is located remotely of the applicator so as to keep the bench top clean of unwanted equipment. As the grease cup or applicator will be exposed to dust settling upon it, a flip over dust cover with handle is provided that is, in this embodiment, moulded from a clear plastic. The clear plastic allows the user a better view of the greasing process. The lid of the cover is clicked over centre and the handle can also act as a lock to prevent inadvertent activation of the grease supply.

Figure 17:
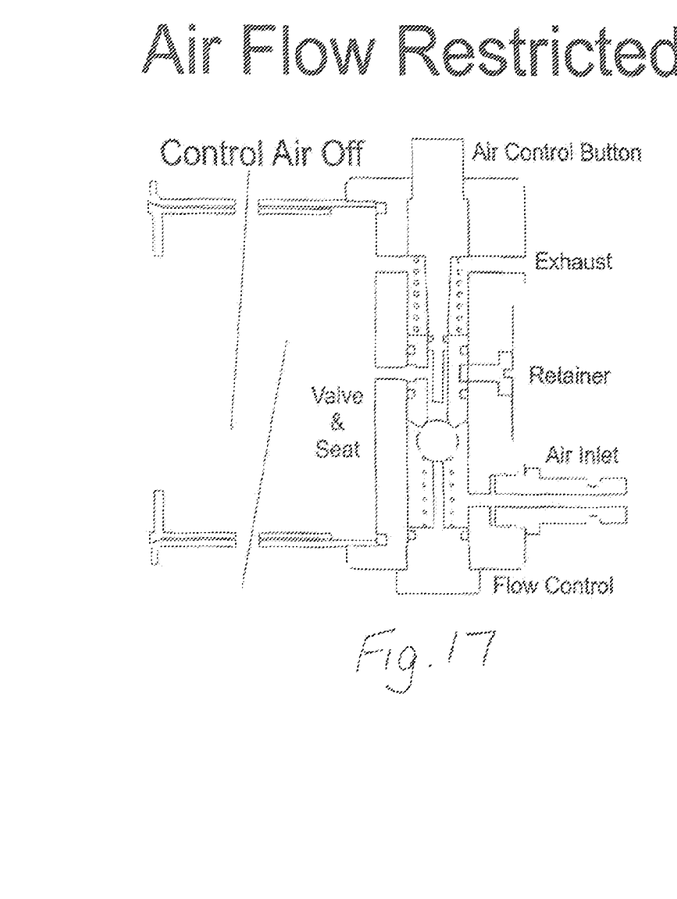
FIGS. 17 and 18 show variations in the control of air flow from the regulator for delivering grease under pressure from the grease cartridge to the applicator.
Figure 18:
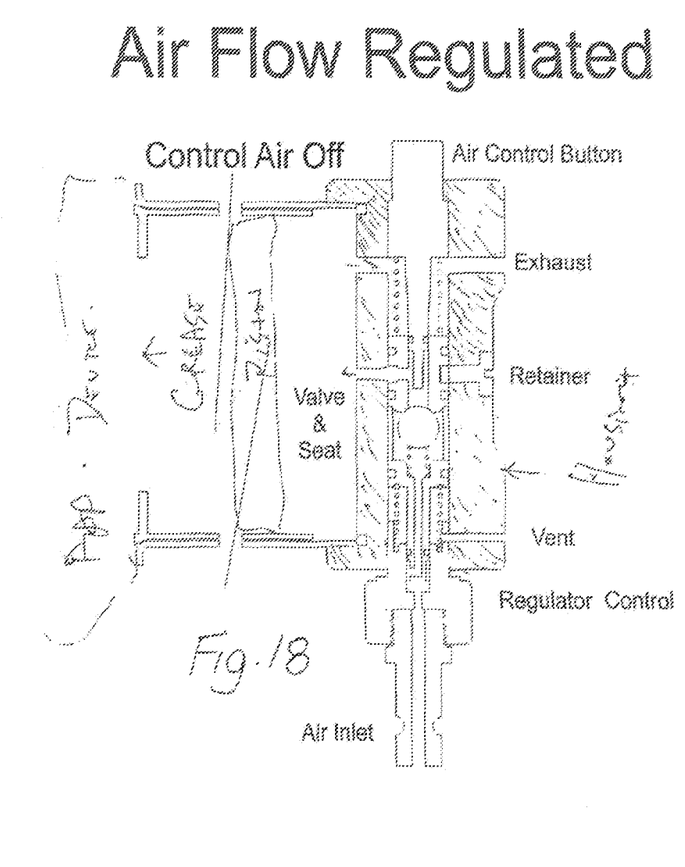

The embodiments shown in FIGS. 17 and 18 are of an air flow restricted embodiment and an air flow regulated embodiment.

Figure 19A:
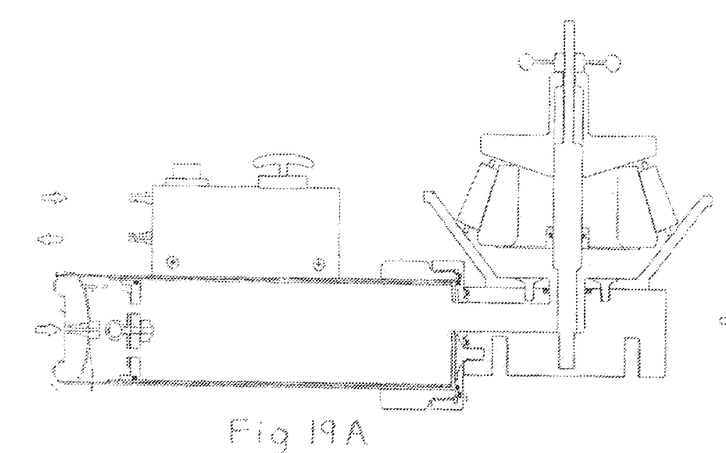
FIG. 19A is a front view of the first embodiment of the invention.
Figure 19B:
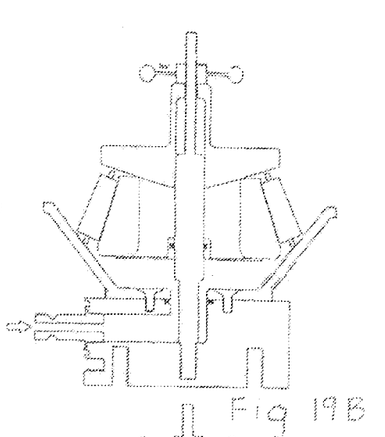
FIG. 19B is an end view, from the right of FIG. 19A thereof.
Figure 19C:
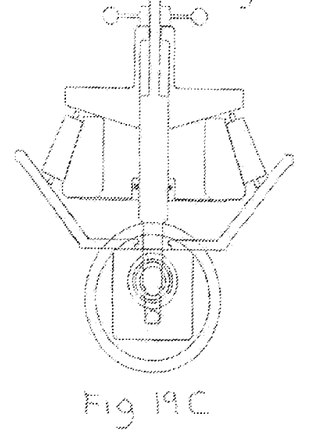
FIG. 19C is an opposite end view thereof.
Figure 19D:
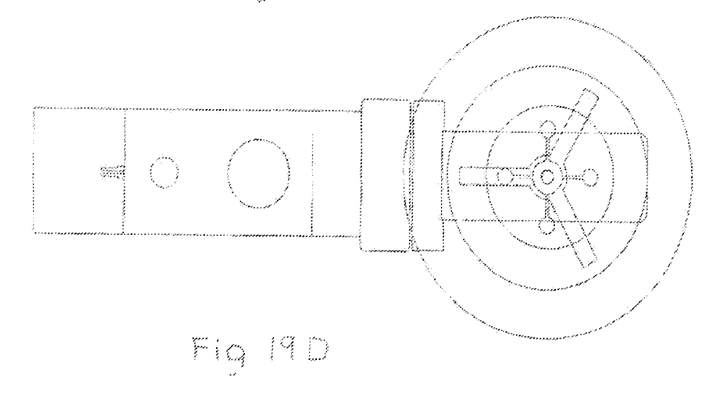
FIG. 19D is a top, plan view thereof.
Figures 20A, 20C, 20D, 20E:
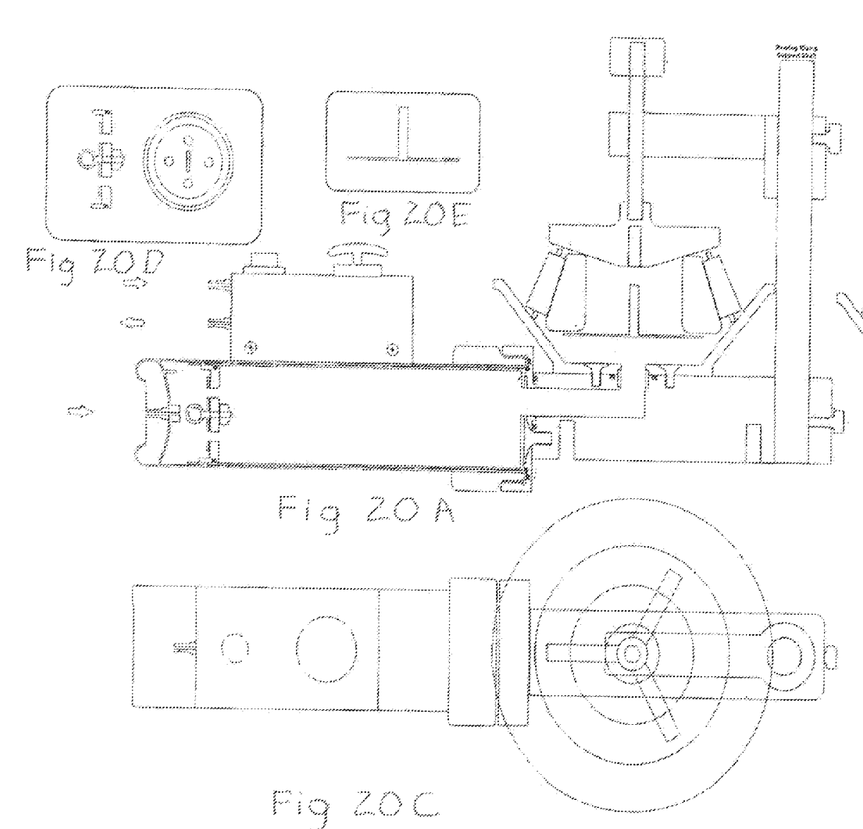
FIG. 20A is a front view thereof.
FIG. 20C is a top, plan view thereof.
FIG. 20D is a detailed view of the piston thereof.
FIG. 20E is a detailed view of the plate thereof.
Figures 20B, 20F:
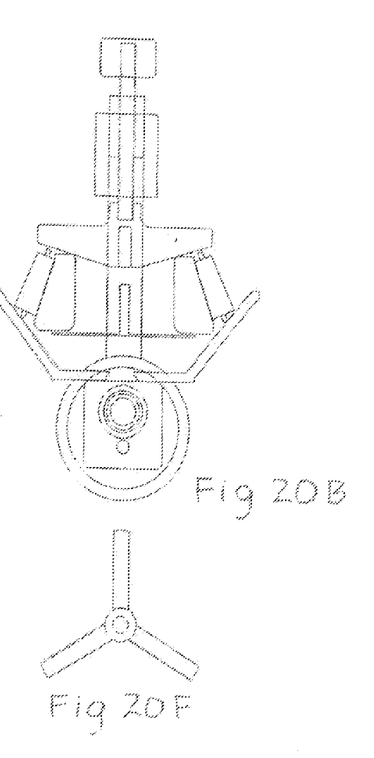
FIG. 20B is an end view, from the right of FIG. 20A thereof.
FIG. 20F is a detailed view of the bearing clamp thereof.

FIG. 19A is a front view of the first embodiment of the invention, FIG. 19B is an end view, from the right of FIG. 19A thereof, FIG. 19C is an opposite end view thereof, FIG. 19D is a top, plan view thereof, FIG. 20A is a front view thereof, FIG. 20B is an end view, from the right of FIG. 20A thereof, FIG. 20C is a top, plan view thereof, FIG. 20D is a detailed view of the piston thereof, FIG. 20E is a detailed view of the plate thereof, and FIG. 20F is a detailed view of the bearing clamp thereof.

Figures 21, 22:
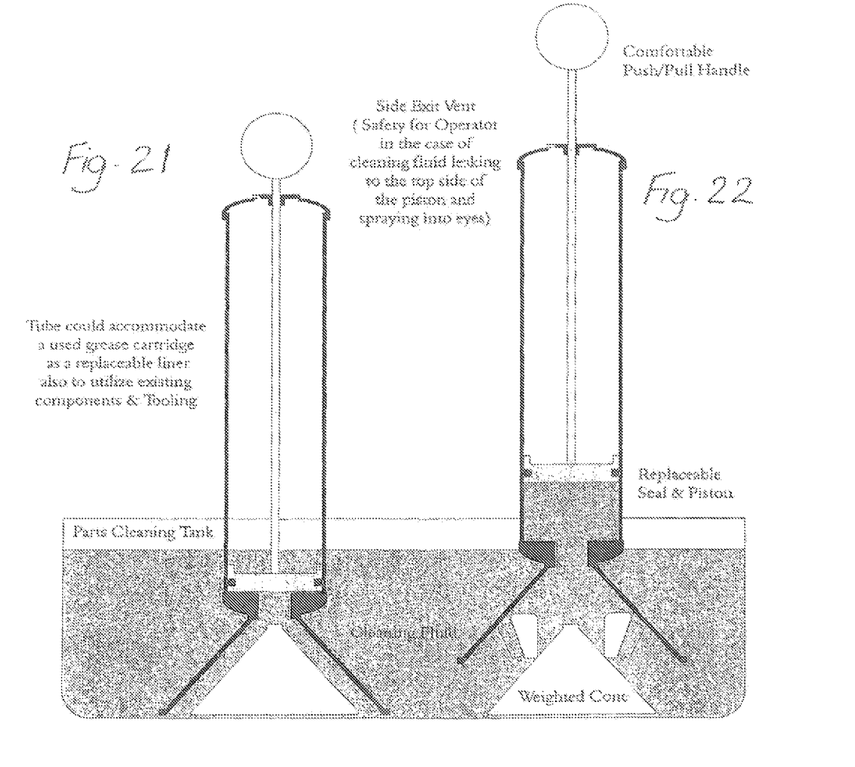
FIGS. 21 and 22 show side sectional views of a bearing flush tool according to another aspect of the invention.

The bearing flush tool shown in FIGS. 21 and 22 may be used to clean grease from bearings in the manner as shown and described.

I claim:

1. A bearing lubrication tool comprising:
   a) supply means for delivering a controlled amount of grease, the supply means including a detachable grease cartridge and air cylinder assembly located remotely of the support means, the grease cartridge being installed in the air cylinder and adapted to be emptied of grease when a supply of compressed air displaces a piston in the cylinder that moves the grease to the grease delivery inlet of the support means,
   b) support means mounted on top of a work bench for locating a bearing in a position where a bearing cage and rollers of the bearing may be lubricated with the grease delivered by the supply means, the supply means having a grease delivery outlet communicating with a grease delivery inlet of the support means by a grease flow passageway, and
   c) means for controlling the passage of grease through the inlet to the bearing cage and rollers of the bearing, the means for controlling including a valve assembly comprising a cup and a retainer, wherein relative movement between the cup and the retainer causes the valve assembly to assume an open condition for allowing grease to pass through the inlet to the bearing cage and rollers of the bearing.

2. The bearing lubrication tool of claim 1 wherein the cup supports the bearing and moves downwardly relative to the retainer by downward pressure exerted on the bearing.

3. The bearing lubrication tool of claim 2 wherein the downward pressure exerted on the bearing is applied through a downwardly pointing cone that is supported on the bearing and which is pressed downwardly by manual application of force on a handle device.

4. The bearing lubrication tool of claim 3 wherein the cone includes means for centering the position of the handle device relative to the cone.

5. The bearing lubrication tool of claim 4 wherein the centering means of the cone comprises an upwardly extending member which engages a downwardly extending member of the handle device.

6. The bearing lubrication tool of claim 5 wherein the upwardly extending member includes a female portion that engages a male portion of the downwardly extending member.

7. The bearing lubrication tool of claim 3 wherein the handle device includes a cover portion for covering the valve assembly when the bearing is not located in a position where it may be lubricated.

8. The bearing lubrication tool of claim 7 wherein the cover portion is made of a clear plastic to allow viewing of the passage of grease to the bearing.

9. The bearing lubrication tool of claim 1 wherein the grease delivery inlet is a detachable coupling to the support means or a grease supply port of the support means.

10. The bearing lubrication tool of claim 1 wherein the cup is supported by spring means and moves downwardly relative to the retainer against upward pressure exerted by the spring means.

11. The bearing lubrication tool of claim 10 wherein the spring means comprise coil springs that press upwardly against an annular seat of the cup, the annular seat having a central opening which, in the absence of downward pressure exerted on the bearing when supported by the cup, is sealed by the retainer so as to prevent passage of grease through the opening.

12. The bearing lubrication tool of claim 11 wherein the retainer is secured in a fixed position through the central opening, and includes a cradle adapted to engage a leading portion of the cone when the bearing is not located in a position where it may be lubricated.

13. A bearing lubrication tool comprising:
   a) supply means for delivering a controlled amount of grease, the supply means including a powered grease storage drum located remotely of the support means, the powered grease storage drum adapted to be emptied of grease when a supply of compressed air moves the grease to the grease delivery inlet of the support means,
   b) support means mounted on top of a work bench for locating a bearing in a position where a bearing cage and rollers of the bearing may be lubricated with the grease delivered by the supply means, the supply means having a grease delivery outlet communicating with a grease delivery inlet of the support means by a grease flow passageway, and
   c) means for controlling the passage of grease through the inlet to the bearing cage and rollers of the bearing, the means for controlling including a valve assembly comprising a cup and a retainer, wherein relative movement between the cup and the retainer causes the valve assembly to assume an open condition for allowing grease to pass through the inlet to the bearing cage and rollers of the bearing.

14. The bearing lubrication tool of claim 13 wherein the supply of compressed air is controlled by an air pressure regulator to allow the grease to flow at a regulated rate and be delivered in a controlled amount to the grease delivery inlet of the support means.

15. The bearing lubrication tool of claim 14 wherein the air pressure regulator maintains a constant air pressure and grease is caused to flow when the valve assembly assumes an open position.

\* \* \* \* \*